US008288585B2

(12) United States Patent
Chen et al.

(10) Patent No.: US 8,288,585 B2
(45) Date of Patent: Oct. 16, 2012

(54) PROCATALYST COMPOSITION WITH SUBSTITUTE 1,2-PHENYLENE AROMATIC DIESTER INTERNAL DONOR AND METHOD

(75) Inventors: Linfeng Chen, Sugar Land, TX (US); Tak W. Leung, Houston, TX (US); Tao Tao, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 254 days.

(21) Appl. No.: 12/650,834

(22) Filed: Dec. 31, 2009

(65) Prior Publication Data

US 2010/0222530 A1     Sep. 2, 2010

Related U.S. Application Data

(60) Provisional application No. 61/141,902, filed on Dec. 31, 2008.

(51) Int. Cl.
*C07C 309/00* (2006.01)
(52) U.S. Cl. ........................................ 562/124
(58) Field of Classification Search .................. None
See application file for complete search history.

(56) References Cited

U.S. PATENT DOCUMENTS

| 4,442,276 A | 4/1984 | Kashiwa et al. |
|---|---|---|
| 4,460,701 A | 7/1984 | Terano et al. |
| 4,540,679 A | 9/1985 | Arzoumanidis et al. |
| 4,547,476 A | 10/1985 | Terano et al. |
| 4,816,433 A | 3/1989 | Terano et al. |
| 4,829,037 A | 5/1989 | Terano et al. |
| 4,927,797 A | 5/1990 | Ewen |
| 4,990,479 A | 2/1991 | Ishimaru et al. |
| 5,028,671 A | 7/1991 | Kioka et al. |
| 5,034,361 A | 7/1991 | Job et al. |
| 5,066,737 A | 11/1991 | Job |
| 5,066,738 A | 11/1991 | Ewen |
| 5,077,357 A | 12/1991 | Job |
| 5,082,907 A | 1/1992 | Job |
| 5,106,806 A | 4/1992 | Job |
| 5,146,028 A | 9/1992 | Job |
| 5,151,399 A | 9/1992 | Job |
| 5,153,158 A | 10/1992 | Kioka et al. |
| 5,229,342 A | 7/1993 | Job |
| 5,247,031 A | 9/1993 | Kioka et al. |
| 5,247,032 A | 9/1993 | Kioka et al. |
| 5,539,309 A | 7/1996 | Van Wyk et al. |
| 6,825,146 B2 | 11/2004 | Kilty et al. |
| 7,388,061 B2 | 6/2008 | Gao et al. |
| 2005/0239636 A1 | 10/2005 | Gao et al. |
| 2010/0204506 A1 | 8/2010 | Chen |

FOREIGN PATENT DOCUMENTS

| EP | 0045976 A2 | 2/1982 |
|---|---|---|
| WO | 2010/021762 A1 | 2/2010 |

OTHER PUBLICATIONS

Barnier et al., Journal of Organometallic Chemistry 514(1996) 67-71.

*Primary Examiner* — Susanna Moore
*Assistant Examiner* — Jennifer C Sawyer
(74) *Attorney, Agent, or Firm* — Whyte Hirschboeck Dudek SC

(57) ABSTRACT

Disclosed are procatalyst compositions having an internal electron donor which include a substituted phenylene aromatic diester and optionally an electron donor component. Ziegler-Natta catalyst compositions containing the present procatalyst compositions exhibit high activity and produce propylene-based olefins with broad molecular weight distribution.

6 Claims, No Drawings

PROCATALYST COMPOSITION WITH SUBSTITUTE 1,2-PHENYLENE AROMATIC DIESTER INTERNAL DONOR AND METHOD

PRIORITY CLAIM

This application claims priority to U.S. provisional patent application Ser. No. 61/141,902 filed on Dec. 31, 2008, the entire content of which is incorporated by reference herein.

BACKGROUND

The present disclosure relates to procatalyst compositions containing a substituted phenylene aromatic diester internal electron donor and the incorporation of the same in catalyst compositions and the process of making olefin-based polymers using said catalyst compositions.

Worldwide demand for olefin-based polymers continues to grow as applications for these polymers become more diverse and more sophisticated. Known are Ziegler-Natta catalyst compositions for the production of olefin-based polymers. Ziegler-Natta catalyst compositions typically include a procatalyst containing a transition metal halide (i.e., titanium, chromium, vanadium), a cocatalyst such as an organoaluminum compound, and optionally an external electron donor. Ziegler-Natta catalyzed olefin-based polymers typically exhibit a narrow range of molecular weight distribution. Given the perennial emergence of new applications for olefin-based polymers, the art recognizes the need for olefin-based polymers with improved and varied properties. Desirable would be Ziegler-Natta catalyst compositions for the production olefin-based polymers that exhibit high catalyst activity during polymerization and produce propylene-based polymers with high isotacticity and broad molecular weight distribution.

SUMMARY

The present disclosure is directed to procatalyst compositions containing a substituted phenylene aromatic diester as an internal electron donor and the application of the same in catalyst compositions and polymerization processes. The substituted phenylene aromatic diester-containing catalyst compositions of the present disclosure demonstrate high activity during polymerization. In addition, the present substituted phenylene aromatic diester-containing catalyst compositions produce propylene-based olefins with high isotacticity and broad molecular weight distribution.

In an embodiment, a process for producing a procatalyst composition is provided. The process includes reacting a substituted phenylene aromatic diester, a procatalyst precursor, and a halogenating agent. The reaction occurs in a reaction mixture. The process includes forming a procatalyst composition by way of halogenation. The procatalyst composition includes an internal electron donor composed of the substituted phenylene aromatic diester.

In an embodiment, a procatalyst composition is provided. The procatalyst composition includes a combination of a magnesium moiety, a titanium moiety and an internal electron donor. The internal electron donor includes a substituted phenylene aromatic diester. The magnesium moiety and/or the titanium moiety may be a respective halide.

In an embodiment, the substituted phenylene aromatic diester has the structure (I):

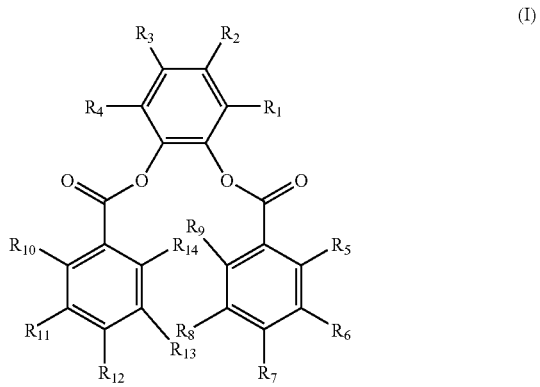

wherein $R_1$-$R_{14}$ are the same or different. Each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

In an embodiment, the structure (I) includes at least one of $R_1$-$R_4$ selected from a substituted hydrocarbyl group having 1 to 20 carbon atoms, an unsubstituted hydrocarbyl group having 1 to 20 carbon atoms, and combinations thereof.

In an embodiment, the structure (I) includes at least one of $R_5$-$R_{14}$ selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

The present disclosure provides another procatalyst composition. In an embodiment, a procatalyst composition is provided that includes a combination of a magnesium moiety, a titanium moiety and a mixed internal electron donor. The mixed internal electron donor includes a substituted phenylene aromatic diester and an electron donor component.

In an embodiment, the electron donor component is selected from a phthalate, an ethyl benzoate, a diether, and combinations thereof.

The present disclosure provides a catalyst composition. The catalyst composition includes a procatalyst composition and a cocatalyst. The procatalyst composition includes a substituted phenylene aromatic diester. In another embodiment, the catalyst composition can include a mixed internal electron donor. The mixed internal electron donor includes a substituted phenylene aromatic diester and an electron donor component as disclosed above.

In an embodiment, the catalyst composition includes an external electron donor, and/or an activity limiting agent.

The present disclosure provides a polymerization process. In an embodiment, a polymerization process is provided that includes contacting, under polymerization conditions, an olefin with a catalyst composition. The catalyst composition includes a substituted phenylene aromatic diester. The process further includes forming an olefin-based polymer.

In an embodiment, the olefin is propylene. The process includes forming a propylene-based polymer having a polydispersity index from about 4.0 to about 15.0.

In an embodiment, the olefin is propylene. The process includes forming a propylene-based polymer having a melt flow rate from about 0.01 g/10 min to about 800 g/10 min.

An advantage of the present disclosure is the provision of an improved procatalyst composition.

An advantage of the present disclosure is the provision of an improved catalyst composition for the polymerization of olefin-based polymers.

An advantage of the present disclosure is a catalyst composition that contains a substituted phenylene aromatic diester, the catalyst composition exhibiting improved activity during polymerization.

An advantage of the present disclosure is a catalyst composition with a substituted phenylene aromatic diester that produces a propylene-based polymer with broad molecular weight distribution.

An advantage of the present disclosure is a catalyst composition that contains a substituted phenylene aromatic diester and has high catalyst activity and produces a propylene-based olefin with high isotacticity, and a broad molecular weight distribution.

DETAILED DESCRIPTION

In an embodiment, a process for producing a procatalyst composition is provided. The process includes reacting a substituted phenylene aromatic diester, a procatalyst precursor and a halogenating agent. The reaction occurs in a reaction mixture. The reaction results in the formation of a procatalyst composition. The procatalyst composition includes a magnesium moiety, a titanium moiety, and an internal electron donor. The internal electron donor includes the substituted phenylene aromatic diester.

The substituted phenylene aromatic diester may be a substituted 1,2-phenylene aromatic diester, a substituted 1,3-phenylene aromatic diester, or a substituted 1,4-phenylene aromatic diester. In an embodiment, a 1,2-phenylene aromatic diester is provided. The substituted 1,2-phenylene aromatic diester has the structure (I) below:

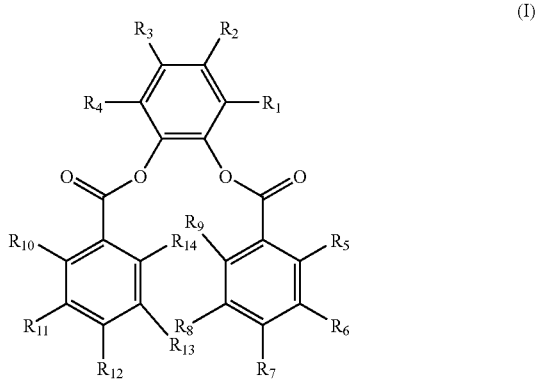

(I)

wherein $R_1$-$R_{14}$ are the same or different. Each of $R_1$-$R_{14}$ is selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

The procatalyst precursor can include (i) magnesium, (ii) a transition metal compound of an element from Periodic Table groups IV to VIII, (iii) a halide, an oxyhalide, and/or an alkoxide of (i) and/or (ii), and (iv) combinations of (i), (ii), and (iii). Nonlimiting examples of suitable procatalyst precursors include halides, oxyhalides, and alkoxides of magnesium, manganese, titanium, vanadium, chromium, molybdenum, zirconium, hafnium, and combinations thereof.

Various methods of making procatalyst precursors are known in the art. These methods are described, inter alia, in U.S. Pat. Nos. 6,825,146, 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, and elsewhere. In an embodiment, the preparation of the procatalyst precursor involves halogenation of mixed magnesium and titanium alkoxides, and may involve the use of one or more compounds, referred to as "clipping agents", that aid in forming specific, low molecular weight, compositions of the desired morphology. Nonlimiting examples of suitable clipping agents include trialkylborates, especially triethylborate, phenolic compounds, especially cresol, and silanes.

In an embodiment, the procatalyst precursor is a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. In one embodiment, the MagMo precursor is a magnesium di($C_{1-4}$)alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having especially desirable morphology and surface area. Moreover, the resulting precursors are particularly uniform in particle size.

In an embodiment, the procatalyst precursor is a benzoate-containing magnesium chloride material ("BenMag"). As used herein, a "benzoate-containing magnesium chloride" ("BenMag") can be a procatalyst (i.e., a halogenated procatalyst precursor) containing a benzoate internal electron donor. The BenMag material may also include a titanium moiety, such as a titanium halide. The benzoate internal donor is labile and can be replaced by other electron donors during procatalyst and/or catalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. Nonlimiting examples of suitable BenMag procatalyst precursors include catalysts of the trade names SHAC™ 103 and SHAC™ 310 available from The Dow Chemical Company, Midland, Mich. In an embodiment, the BenMag procatalyst precursor may be a product of halogenation of any procatalyst precursor (i.e., a MagMo precursor or a MagTi precursor) in the presence of a benzoate compound.

The present procatalyst composition also includes an internal electron donor. As used herein, an "internal electron donor" is a compound added during formation of the procatalyst composition that donates a pair of electrons to one or more metals present in the resultant procatalyst composition. Not bounded by any particular theory, it is believed that the internal electron donor assists in regulating the formation of active sites and thus enhances catalyst stereoselectivity. In an embodiment, the internal electron donor includes a substituted phenylene aromatic diester of structure (I).

In an embodiment, the procatalyst precursor is converted to a solid procatalyst by way of halogenation. Halogenation includes contacting the procatalyst precursor with a halogenating agent in the presence of the internal electron donor. Halogenation converts the magnesium moiety present in the procatalyst precursor into a magnesium halide support upon which the titanium moiety (such as a titanium halide) is deposited. Not wishing to be bound by any particular theory, it is believed that during halogenation the internal electron donor (1) regulates the position of titanium on the magnesium-based support, (2) facilitates conversion of the magnesium and titanium moieties into respective halides and (3) regulates the crystallite size of the magnesium halide support during conversion. Thus, provision of the internal electron donor yields a procatalyst composition with enhanced stereoselectivity.

In an embodiment, the halogenating agent is a titanium halide having the formula $Ti(OR^e)_f X_h$ wherein $R^e$ and X are defined as above, f is an integer from 0 to 3; h is an integer from 1 to 4; and f+h is 4. In an embodiment, the halogenating agent is $TiCl_4$. In a further embodiment, the halogenation is conducted in the presence of a chlorinated or a non-chlorinated aromatic liquid, such as dichlorobenzene, o-chlorotoluene, chlorobenzene, benzene, toluene, or xylene. In yet another embodiment, the halogenation is conducted by use of a mixture of halogenating agent and chlorinated aromatic liquid comprising from 40 to 60 volume percent halogenating agent, such as $TiCl_4$.

In an embodiment, the reaction mixture is heated during halogenation. The procatalyst precursor and halogenating agent are contacted initially at a temperature from 0° C. to 60° C., or from 20° C. to 30° C., or from 60° C. to 130° C., and heating is commenced at a rate of 0.1 to 10.0° C./minute, or at a rate of 1.0 to 5.0° C./minute. The internal electron donor may be added later, after an initial contact period between the halogenating agent and procatalyst precursor. Temperatures for the halogenation are from 60° C. to 150° C. (or any value or subrange therebetween), or from 90° C. to 120° C. Halogenation may be continued in the substantial absence of the internal electron donor for a period from 5 to 60 minutes, or from 10 to 50 minutes.

The manner in which the procatalyst precursor, the halogenating agent and the internal electron donor are contacted may be varied. In an embodiment, the procatalyst precursor is first contacted with a mixture containing the halogenating agent and a chlorinated aromatic compound. The resulting mixture is stirred and may be heated if desired. Next, the internal electron donor is added to the same reaction mixture without isolating or recovering of the precursor. The foregoing process may be conducted in a single reactor with addition of the various ingredients controlled by automated process control.

In an embodiment, the procatalyst precursor is contacted with the internal electron donor before reacting with halogenating agent.

Contact times of the procatalyst precursor with the internal electron donor are at least 10 minutes, or at least 15 minutes, or at least 20 minutes, or at least 1 hour at a temperature from at least 25° C., or at least 50° C., or at least 60° C. up to a temperature of 150° C., or up to 120° C., or up to 115° C., or up to 110° C.

In an embodiment, the procatalyst precursor, the internal electron donor, and the halogenating agent are added simultaneously or substantially simultaneously.

The halogenation procedure may be repeated one, two, three, or more times as desired. In an embodiment, the resulting solid material is recovered from the reaction mixture and contacted one or more times in the absence (or in the presence) of the same (or different) internal electron donor components with a mixture of the halogenating agent in the chlorinated aromatic compound for at least about 10 minutes, or at least about 15 minutes, or at least about 20 minutes, and up to about 10 hours, or up to about 45 minutes, or up to about 30 minutes, at a temperature from at least about 25° C., or at least about 50° C., or at least about 60° C., to a temperature up to about 150° C., or up to about 120° C., or up to about 115° C.

After the foregoing halogenation procedure, the resulting solid procatalyst composition is separated from the reaction medium employed in the final process, by filtering for example, to produce a moist filter cake. The moist filter cake may then be rinsed or washed with a liquid diluent to remove unreacted $TiCl_4$ and may be dried to remove residual liquid, if desired. Typically the resultant solid procatalyst composition is washed one or more times with a "wash liquid," which is a liquid hydrocarbon such as an aliphatic hydrocarbon such as isopentane, isooctane, isohexane, hexane, pentane, or octane. The solid procatalyst composition then can be separated and dried or slurried in a hydrocarbon, especially a relatively heavy hydrocarbon such as mineral oil for further storage or use.

In an embodiment, the resulting solid procatalyst composition has a titanium content of from about 1.0 percent by weight to about 6.0 percent by weight, based on the total solids weight, or from about 1.5 percent by weight to about 4.5 percent by weight, or from about 2.0 percent by weight to about 3.5 percent by weight. The weight ratio of titanium to magnesium in the solid procatalyst composition is suitably between about 1:3 and about 1:160, or between about 1:4 and about 1:50, or between about 1:6 and 1:30. In an embodiment, the internal electron donor may be present in the procatalyst composition in a molar ratio of internal electron donor to magnesium of from about 0.005:1 to about 1:1, or from about 0.01:1 to about 0.4:1. Weight percent is based on the total weight of the procatalyst composition.

In an embodiment, the procatalyst composition may be further treated by one or more of the following procedures prior to or after isolation of the solid procatalyst composition. The solid procatalyst composition may be contacted (halogenated) with a further quantity of titanium halide compound, if desired; it may be exchanged under metathesis conditions with an acid chloride, such as phthaloyl dichloride or benzoyl chloride; and it may be rinsed or washed, heat treated; or aged. The foregoing additional procedures may be combined in any order or employed separately, or not at all.

Not wishing to be bound by any particular theory, it is believed that (1) further halogenation by contacting the previously formed procatalyst composition with a titanium halide compound, especially a solution thereof in a halohydrocarbon diluent, and/or (2) further washing the previously formed procatalyst composition with a halohydrocarbon at an elevated temperature (100-150° C.), results in desirable modification of the procatalyst composition, possibly by removal of certain inactive or undesired metal compounds that are soluble in the foregoing diluent. Accordingly, in an embodiment, the procatalyst is contacted with a halogenating agent, such as a mixture of a titanium halide and a halohydrocarbon diluent, such as $TiCl_4$ and chlorobenzene, one or more times prior to isolation or recovery. In another embodiment, the procatalyst is washed at a temperature between 100 to 150° C. with chlorobenzene or o-chlorotoluene one or more times prior to isolation or recovery.

The present process for producing a procatalyst composition may comprise two or more embodiments disclosed herein.

In an embodiment, a procatalyst composition is provided which includes a combination of a magnesium moiety, a titanium moiety and an internal electron donor. The internal electron donor includes the substituted phenylene aromatic diester. The procatalyst composition is produced by way of the foregoing halogenation procedure which converts the procatalyst precursor and the substituted phenylene aromatic diester donor into the combination of the magnesium and titanium moieties, into which the internal electron donor is incorporated. The procatalyst precursor from which the procatalyst composition is formed can be the magnesium moiety precursor, the mixed magnesium/titanium precursor, or the benzoate-containing magnesium chloride precursor.

In an embodiment, the magnesium moiety is a magnesium halide. In another embodiment, the magnesium halide is magnesium chloride, or magnesium chloride alcohol adduct.

In an embodiment, the titanium moiety is a titanium halide such as a titanium chloride. In another embodiment the titanium moiety is titanium tetrachloride.

In another embodiment, the procatalyst composition includes a magnesium chloride support upon which a titanium chloride is deposited and upon which the internal electron donor is incorporated.

In an embodiment, the internal electron donor of the procatalyst composition includes the substituted phenylene aromatic diester of structure (I):

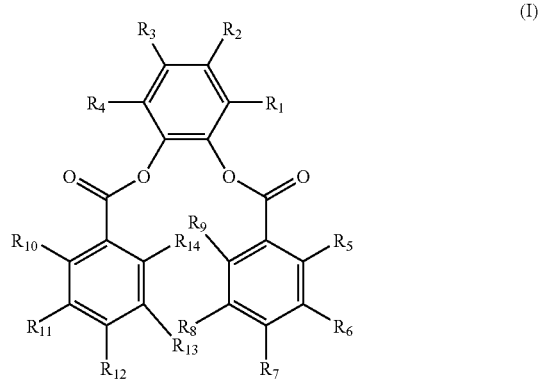

wherein $R_1$-$R_{14}$ are the same or different. Each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

In an embodiment, the substituted phenylene aromatic diester may be any substituted phenylene aromatic diester as disclosed in U.S. patent application Ser. No. 61/141,959 filed on Dec. 31, 2008, the entire content of which is incorporated by reference herein.

In an embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$ at least one $R_5$-$R_9$ of and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In an embodiment, the inter-/intra-cyclic structure is a $C_5$ or a $C_6$ membered ring.

In an embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In an embodiment, any consecutive R groups in $R_1$-$R_4$, and/or in $R_5$-$R_9$, and/or in $R_{10}$-$R_{14}$, may be members of a $C_5$-$C_6$-membered ring.

In an embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, $R_2$ is selected from a $C_1$-$C_8$ alkyl group, a $C_3$-$C_6$ cycloalkyl, or a substituted $C_3$-$C_6$ cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In an embodiment, structure (I) includes $R_2$ that is methyl, and each of $R_5$-$R_{14}$ is hydrogen.

In an embodiment, structure (I) includes $R_2$ that is ethyl, and each of $R_5$-$R_{34}$ is hydrogen.

In an embodiment, structure (I) includes $R_2$ that is t-butyl, and each of $R_5$-$R_{14}$ is hydrogen.

In an embodiment, structure (I) includes $R_2$ that is ethoxycarbonyl, and each of $R_5$-$R_{14}$ is hydrogen.

In an embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$—$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (I) includes $R_1$ that is methyl, and each of $R_5$-$R_{14}$ is hydrogen.

In an embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (I) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_8$ alkyl group or a halogen.

In an embodiment, structure (I) includes $R_1$ that is a methyl group and $R_3$ that is a t-butyl group. Each of $R_2$, $R_4$ and $R_5$-$R_{14}$ is hydrogen.

In an embodiment, structure (I) includes $R_1$ and $R_3$ that is an isopropyl group. Each of $R_2$, $R_4$ and $R_5$-$R_{14}$ is hydrogen.

In an embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In an embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In an embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In an embodiment, the substituted phenylene aromatic diester has a structure (II) which includes $R_1$ that is a methyl group and $R_3$ is a t-butyl group. Each of $R_2$ and $R_4$ is hydrogen. $R_8$ and $R_9$ are members of a $C_6$ membered ring to form a 1-naphthoyl moiety. $R_{13}$ and $R_{14}$ are members of a $C_6$ membered ring to form another 1-naphthoyl moiety. Structure (II) is provided below.

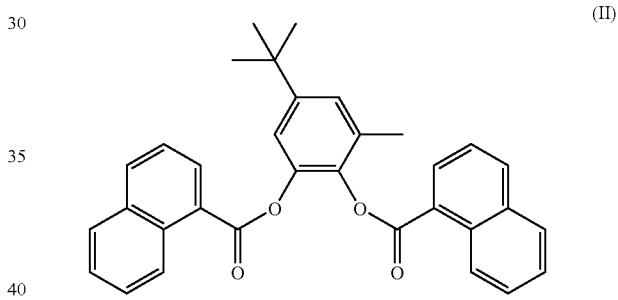

In an embodiment, the substituted phenylene aromatic diester has a structure (III) which includes $R_1$ that is a methyl group and $R_3$ is a t-butyl group. Each of $R_2$ and $R_4$ is hydrogen. $R_6$ and $R_7$ are members of a $C_6$ membered ring to form a 2-naphthoyl moiety. $R_{12}$ and $R_{13}$ are members of a $C_6$ membered ring to form a 2-naphthoyl moiety. Structure (III) is provided below.

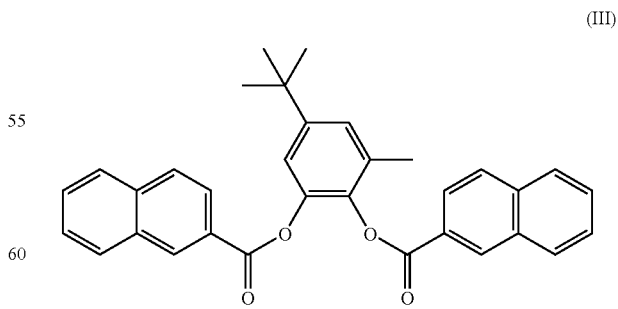

In an embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In an embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In an embodiment, structure (I) include $R_1$ that is a methyl group and $R_3$ is a t-butyl group. Each of $R_2$, $R_4$ and $R_5$-$R_{14}$ is a fluorine atom.

In an embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, $R_1$ is methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an diethylamino group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In an embodiment, structure (I) includes $R_1$ and $R_3$, each of which is a sec-butyl group. Each of $R_2$, $R_4$ and $R_5$-$R_{14}$ is hydrogen.

In an embodiment, the substituted phenylene aromatic diester has a structure (IV) whereby $R_1$ and $R_2$ are members of a $C_6$ membered ring to form a 1,2-naphthalene moiety. Each of $R_5$-$R_{14}$ is hydrogen. Structure (IV) is provided below.

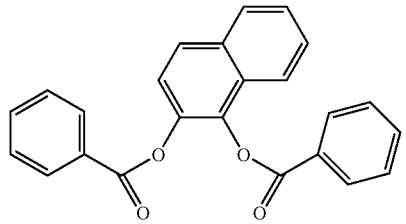

(IV)

In an embodiment, the substituted phenylene aromatic diester has a structure (V) whereby $R_2$ and $R_3$ are members of a $C_6$ membered ring to form a 2,3-naphthalene moiety. Each of $R_5$-$R_{14}$ is hydrogen. Structure (V) is provided below.

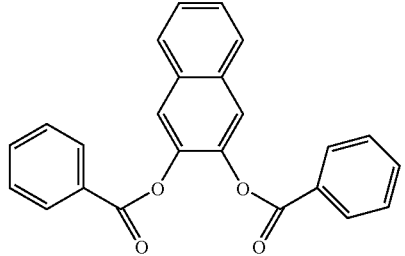

(V)

In an embodiment, structure (I) includes $R_1$ and $R_4$ that are each a methyl group. Each of $R_2$, $R_3$, $R_5$-$R_9$ and $R_{10}$-$R_{14}$ is hydrogen.

In an embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In an embodiment, structure (I) includes $R_1$, $R_3$, and $R_4$, each of which is an i-propyl group. Each of $R_2$, $R_5$-$R_9$ and $R_{10}$-$R_{14}$ is hydrogen.

Ethoxide content in the procatalyst composition indicates the completeness of conversion of precursor metal ethoxide into a metal halide. The present internal electron donor assists in converting ethoxide into halide during halogenation. In an embodiment, the procatalyst composition includes from about 0.01 wt % to about 1.0 wt %, or from about 0.05 wt % to about 0.5 wt % ethoxide. Weight percent is based on the total weight of the procatalyst composition.

In an embodiment, the procatalyst composition includes from about 0.1 wt % to about 30.0 wt %, or from about 1.0 wt % to about 25.0 wt %, or from about 5.0 wt % to about 20.0 wt % substituted phenylene aromatic diester. Weight percent is based on the total weight of the procatalyst composition.

In an embodiment, the procatalyst composition includes from about 0.1 wt % to about 6.0 wt %, or from about 1.0 wt % to about 5.0 wt % titanium. Weight percent is based on the total weight of the procatalyst composition.

In an embodiment, the magnesium to internal electron donor molar ratio is from about 100:1 to about 1:1, or from about 30:1 to about 2:1, or from about 20:1 to about 3:1.

In an embodiment, another procatalyst composition is provided. The procatalyst composition includes a combination of a magnesium moiety, a titanium moiety and a mixed internal electron donor. As used herein, a "mixed internal electron donor" is (i) a substituted phenylene aromatic diester, (ii) an electron donor component that donates a pair of electrons to one or more metals present in the resultant procatalyst composition, and (iii) optionally other components. In an embodiment, the electron donor component is a phthalate, a diether, a benzoate, and combinations thereof. The procatalyst composition with the mixed internal electron donor can be produced by way of the procatalyst production procedure as previously disclosed.

The present procatalyst compositions may comprise two or more embodiments disclosed herein.

In an embodiment, a catalyst composition is provided. As used herein, "a catalyst composition" is a composition that forms an olefin-based polymer when contacted with an olefin under polymerization conditions. The catalyst composition includes a procatalyst composition and a cocatalyst. The procatalyst composition can be any of the foregoing procatalyst compositions containing a substituted phenylene aromatic diester. The catalyst composition may optionally include an external electron donor and/or an activity limiting agent.

In an embodiment, the internal electron donor of the catalyst composition is a substituted phenylene aromatic diester. The substituted phenylene aromatic diester can be any substituted phenylene aromatic diester as disclosed herein.

In an embodiment, the internal electron donor of the catalyst composition is a mixed internal electron donor. The mixed internal electron donor can include (i) a substituted phenylene aromatic diester and a phthalate, (ii) a substituted phenylene aromatic diester and a benzoate (such as ethyl benzoate), or (iii) a substituted phenylene aromatic diester and a diether.

The catalyst composition includes a cocatalyst. As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In an embodiment, the cocatalyst is selected from triethylaluminum, triisobutylaluminum, tri-n-hexylaluminum, diisobutylaluminum hydride, and di-n-hexylaluminum hydride.

In an embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, and dimethylaluminum chloride.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1. In another embodiment, the molar ratio of aluminum to titanium is about 45:1.

In an embodiment, the catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, (i.e., to reduces xylene soluble material in the formant polymer).

In an embodiment, the external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In an embodiment, the external electron donor is an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the silane composition is dicyclopentyldimethoxysilane (DCPDMS), methylcyclohexyldimethoxysilane (MChDMS), or n-propyltrimethoxysilane (NPTMS), and any combination of thereof.

In an embodiment, the external donor can be a mixture of at least 2 alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In an embodiment, the external electron donor is selected from one or more of the following: a benzoate, a succinate, and/or a diol ester. In an embodiment, the external electron donor is 2,2,6,6-tetramethylpiperidine. In another embodiment, the external electron donor is a diether.

In an embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

Nonlimiting examples of suitable polycarboxylic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl terephthalate, dioctyl terephthalate, and bis[4-(vinyloxy)butyl] terephthalate.

The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ alkyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleates, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the activity limiting agent includes a diether. The diether can be a 1,3-diether compound represented by the following structure (VI):

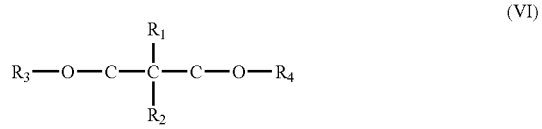

(VI)

wherein $R_1$ to $R_4$ are independently of one another an alkyl, aryl or aralkyl group having up to 20 carbon atoms, which may optionally contain a group 14, 15, 16, or 17 heteroatom, and $R_1$ and $R_2$ may be a hydrogen atom. The dialkylether may linear or branched, and may include one or more of the following groups: alkyl, cycloaliphatic, aryl, alkylaryl or arylalkyl radicals with 1-18 carbon atoms, and hydrogen. $R_1$ and $R_2$ may be linked to form a cyclic structure, such as cyclopentadiene or fluorene.

In an embodiment, the activity limiting agent includes a succinate composition having the following structure (VII):

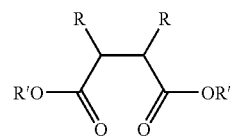

(VII)

wherein R and R' may be the same or different, R and/or R' including one or more of the following groups: hydrogen, linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (VIII):

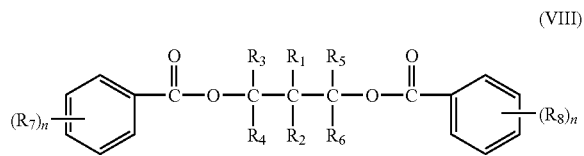

(VIII)

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$ may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

In an embodiment, the external electron donor and/or activity limiting agent can be added into the reactor separately. In another embodiment, the external electron donor and the activity limiting agent can be mixed together in advance and then added into the reactor as a mixture. In the mixture, more than one external electron donor or more than one activity limiting agent can be used. In an embodiment, the mixture is dicyclopentyldimethoxysilane and isopropyl myristate, dicyclopentyldimethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane and isopropyl myristate, and combinations thereof.

In an embodiment, the catalyst composition includes any of the foregoing external electron donors in combination with any of the foregoing activity limiting agents.

The present catalyst composition may comprise two or more embodiments disclosed herein.

In an embodiment, a process for producing an olefin-based polymer is provided. The process includes contacting an olefin with a catalyst composition under polymerization conditions. The catalyst composition includes a substituted phenylene aromatic diester. The substituted phenylene aromatic diester can be any substituted phenylene dibenzoate as disclosed herein. The process further includes forming an olefin-based polymer.

In an embodiment, the catalyst composition includes a procatalyst composition and a cocatalyst. The procatalyst composition may be any procatalyst composition as disclosed herein. The procatalyst composition may include a substituted phenylene aromatic diester as the internal electron donor or a mixed internal electron donor as disclosed herein. The cocatalyst may be any cocatalyst as disclosed herein. The catalyst composition may optionally include an external electron donor and/or an activity limiting agent as previously disclosed.

In an embodiment, the olefin-based polymer can be a propylene-based olefin, an ethylene-based olefin, and combinations thereof. In an embodiment, the olefin-based polymer is a propylene-based polymer.

One or more olefin monomers can be introduced into a polymerization reactor to react with the catalyst and to form a polymer, or a fluidized bed of polymer particles. Nonlimiting examples of suitable olefin monomers include ethylene, propylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnaphthalene; and halogen-substituted $C_{8-40}$ vinyl aromatic compounds such as chlorostyrene and fluorostyrene.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, reactor.

In an embodiment, polymerization occurs by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In an embodiment, the contacting occurs by way of feeding the catalyst composition into a polymerization reactor and introducing the olefin into the polymerization reactor. In an embodiment, the cocatalyst can be mixed with the procatalyst composition (pre-mix) prior to the introduction of the procatalyst composition into the polymerization reactor. In another embodiment, cocatalyst is added to the polymerization reactor independently of the procatalyst composition. The independent introduction of the cocatalyst into the polymerization reactor can occur simultaneously, or substantially simultaneously, with the procatalyst composition feed.

In an embodiment, the polymerization process may include a pre-polymerization step. Pre-polymerization includes contacting a small amount of the olefin with the procatalyst composition after the procatalyst composition has been contacted with the co-catalyst and the selectivity determining agent and/or the activity limiting agent. Then, the resulting preactivated catalyst stream is introduced into the polymerization reaction zone and contacted with the remainder of the olefin monomer to be polymerized, and optionally one or more of the external electron donor components. Pre-polymerization results in the procatalyst composition being combined with the cocatalyst and the selectivity determining agent and/or the activity limiting agent, the combination being dispersed in a matrix of the formant polymer. Optionally, additional quantities of the selectivity determining agent and/or the activity limiting agent may be added.

In an embodiment, the polymerization process may include a pre-activation step. Pre-activation includes contacting the procatalyst composition with the co-catalyst and the selectivity determining agent and/or the activity limiting agent. The resulting preactivated catalyst stream is subsequently introduced into the polymerization reaction zone and contacted with the olefin monomer to be polymerized, and optionally one or more of the external electron donor components. Pre-activation results in the procatalyst composition being combined with the cocatalyst and the selectivity determining agent and/or the activity limiting agent. Optionally, additional quantities of the selectivity determining agent and/or the activity limiting agent may be added.

In an embodiment, the process includes mixing the external electron donor (and optionally the activity limiting agent) with the procatalyst composition. The external electron donor can be complexed with the cocatalyst and mixed with the procatalyst composition (pre-mix) prior to contact between the catalyst composition and the olefin. In another embodiment, the external electron donor and/or the activity limiting agent can be added independently to the polymerization reactor. In an embodiment, the external electron donor is dicyclopentyldimethoxysilane or n-propyltrimethoxysilane.

In another embodiment, the catalyst composition includes dicyclopentyldimethoxysilane or n-propyltrimethoxysilane and an activity limiting agent such as isopropyl myristate.

In an embodiment, a polypropylene homopolymer is produced in a first reactor. The content of the first reactor is subsequently transferred to a second reactor into which ethylene is introduced. This results in production of a propylene-ethylene copolymer in the second reactor.

In an embodiment, a polypropylene homopolymer is formed via introduction of propylene and any of the present procatalyst compositions, cocatalysts, external electron donors, and activity limiting agents in the first reactor. The polypropylene homopolymer is introduced into the second reactor along with ethylene and optionally an external electron donor and/or an activity limiting agent. The external electron donor and the activity limiting agent may be the same as or different from the respective components used in the first reactor. This produces a propylene-ethylene copolymer in the second reactor.

In an embodiment, the olefin is propylene. The process includes forming a propylene-based polymer having a melt flow rate (MFR) from about 0.01 g/10 min to about 800 g/10 min, or from about 0.1 g/10 min to about 200 g/10 min, or from about 0.5 g/10 min to about 150 g/10 min. In a further embodiment, the propylene-based polymer is a polypropylene homopolymer.

In an embodiment, the olefin is propylene. The process includes forming a propylene-based polymer having a xylene solubles content from about 0.5% to about 10%, or from about 1% to about 8%, or from about 1% to about 4%. In a further embodiment, the propylene-based polymer is a polypropylene homopolymer.

In an embodiment, the olefin is propylene. The process includes forming a propylene-based polymer having a polydispersity index (PDI) from about 4 to about 15, or from about 4 to about 10, or from about 4 to about 8. In a further embodiment, the propylene-based polymer is a polypropylene homopolymer.

The present disclosure provides another process. In an embodiment, a polymerization process is provided and includes contacting propylene and ethylene and/or 1-butene with a catalyst composition under polymerization conditions. The catalyst composition may be any catalyst composition disclosed herein containing a substituted phenylene aromatic diester. The process includes forming a random propylene-based interpolymer having an MFR from about 0.01 g/10 min to about 200 g/10 min, or from about 0.1 g/10 min to about 100 g/10 min, or from about 0.5 g/10 min to about 70 g/10 min. The formant propylene-based interpolymer has a xylene solubles content from about 0.5% to about 40%, or from about 1% to about 30%, or from about 1% to about 20%.

The formant propylene-based interpolymer has a weight percent comonomer content relative to propylene of from about 0.001% to about 20%, or from about 0.01% to about 15%, or from about 0.1% to about 10%.

In an embodiment, the olefin-based polymer (i.e., propylene-based polymer) produced by any of the foregoing processes comprises a substituted phenylene aromatic diester.

The present polymerization process may comprise two or more embodiments disclosed herein.

Not wishing to be bound by any particular theory, it is believed that the present catalyst compositions with substituted phenylene aromatic diester internal electron donor yield olefin-based polymers with a broad molecular weight distribution, high catalyst activity, and high stereoselectivity. Moreover, the present substituted phenylene aromatic diester advantageously provides the present procatalyst composition(s), catalyst composition(s), and olefin-based polymer(s) the property of being phthalate-free, or otherwise void or devoid of phthalate and/or derivatives thereof.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term, "ethylene/α-olefin interpolymer," as used herein, refers to an interpolymer that comprises a majority weight percent polymerized ethylene monomer (based on the total amount of polymerizable monomers), and at least one polymerized α-olefin.

The term, "propylene-based polymer," as used herein, refers to a polymer that comprises a majority weight percent polymerized propylene monomer (based on the total amount of polymerizable monomers), and optionally may comprise at least one polymerized comonomer.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, n-butyl, t-butyl, i-butyl (or 2-methylpropyl), etc. The alkyls have 1 and 20 carbon atoms.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

Test Methods

Flexural modulus is determined in accordance with ASTM D790-00.

Melt flow rate is measured in accordance with ASTM D 1238-01 test method at 230° with a 2.16 kg weight for propylene-based polymers.

Xylene Solubles (XS) is measured using a $^1$H NMR method as described in U.S. Pat. No. 5,539,309, the entire content of which is incorporated herein by reference.

Polydispersity Index (PDI) is measured by an AR-G2 rheometer which is a stress control dynamic spectrometer manufactured by TA Instruments using a method according to Zeichner G R, Patel P D (1981) "A comprehensive Study of Polypropylene Melt Rheology" Proc. Of the $2^{nd}$ World Congress of Chemical Eng., Montreal, Canada. An ETC oven is used to control the temperature at 180° C.±0.1° C. Nitrogen is used to purge the inside the oven to keep the sample from degradation by oxygen and moisture. A pair of 25 mm in diameter cone and plate sample holder is used. Samples are compress molded into 50 mm×100 mm×2 mm plaque. Samples are then cut into 19 mm square and loaded on the center of the bottom plate. The geometries of upper cone is (1) Cone angle: 5:42:20 (deg:min:I); (2) Diameter: 25 mm; (3) Truncation gap: 149 micron. The geometry of the bottom plate is 25 mm cylinder.

Testing Procedure:
(1) The cone & plate sample holder are heated in the ETC oven at 180° C. for 2 hours. Then the gap is zeroed under blanket of nitrogen gas.
(2) Cone is raised to 2.5 mm and sample loaded unto the top of the bottom plate.
(3) Start timing for 2 minutes.
(4) The upper cone is immediately lowered to slightly rest on top of the sample by observing the normal force.
(5) After two minutes the sample is squeezed down to 165 micron gap by lower the upper cone.
(6) The normal force is observed. When the normal force is down to <0.05 Newton the excess sample is removed from the edge of the cone and plate sample holder by a spatula.
(7) The upper cone is lowered again to the truncation gap which is 149 micron.
(8) An Oscillatory Frequency Sweep test is performed under these conditions:
Test delayed at 180° C. for 5 minutes.
Frequencies: 628.3 r/s to 0.1 r/s.
Data acquisition rate: 5 point/decade.
Strain: 10%
(9) When the test is completed the crossover modulus (Gc) is detected by the Rheology Advantage Data Analysis program furnished by TA Instruments.
(10) PDI=100,000÷Gc (in Pa units).

Final melting point Tm(f) is the temperature to melt the most perfect crystal in the sample and is regarded as a measure for isotacticity and inherent polymer crystallizability. The test was conducted using a TA Q100 Differential Scanning Calorimeter. A sample is heated from 0° C. to 240° C. at a rate of 80° C./min, cooled at the same rate to 0° C., then heated again at the same rate up to 150° C., held at 150° C. for 5 minutes and the heated from 150° C. to 180° C. at 1.25° C./min. The Tm(f) is determined from this last cycle by calculating the onset of the baseline at the end of the heating curve.

Testing Procedure:
(1) Calibrate instrument with high purity indium as standard.
(2) Purge the instrument head/cell with a constant 50 ml/min flow rate of nitrogen constantly.
(3) Sample preparation:
Compression mold 1.5 g of powder sample using a 30-G302H-18-CX Wabash Compression Molder (30 ton): (a) heat mixture at 230° C. for 2 minutes at contact; (b) compress the sample at the same temperature with 20 ton pressure for 1 minute; (c) cool the sample to 45° F. and hold for 2 minutes with 20 ton pressure; (d) cut the plaque into 4 of about the same size, stack them together, and repeat steps (a)-(c) in order to homogenize sample.
(4) Weigh a piece of sample (preferably between 5 to 8 mg) from the sample plaque and seal it in a standard aluminum sample pan. Place the sealed pan containing the sample on the sample side of the instrument head/cell and place an empty sealed pan in the reference side. If using the auto sampler, weigh out several different sample specimens and set up the machine for a sequence.
(5) Measurements:
(i) Data storage: off
(ii) Ramp 80.00° C./min to 240.00° C.

(iii) Isothermal for 1.00 min
(iv) Ramp 80.00° C./min to 0.00° C.
(v) Isothermal for 1.00 min
(vi) Ramp 80.00° C./min to 150.00° C.
(vii) Isothermal for 5.00 min
(viii) Data storage: on
(ix) Ramp 1.25° C./min to 180.00° C.
(x) End of method
(6) Calculation: Tm(f) is determined by the interception of two lines. Draw one line from the base-line of high temperature. Draw another line from through the deflection of the curve close to the end of the curve at high temperature side.

By way of example and not by limitation, examples of the present disclosure will now be provided.

I. Substituted Phenylene Aromatic Diester

Substituted phenylene aromatic diester may be synthesized in accordance with U.S. patent application Ser. No. 61/141,959 filed on Dec. 31, 2008, the entire content of which is incorporated by reference herein. Nonlimiting examples of suitable substituted phenylene aromatic diester are provided in Table 1 below.

TABLE 1

| Compound | Structure | $^1$H NMR (500 MHz, CDCl$_3$, ppm) |
|---|---|---|
| 1,2-phenylene dibenzoate (IED1)* | | δ 8.08 (dd, 4H), 7.54 (tt, 2H), 7.34-7.43 (m, 8H). |
| 3-methyl-5-tert-butyl-1,2-phenylene dibenzoate (IED2) | | δ 8.08 (dd, 2H), 8.03 (dd, 2H), 7.53 (tt, 1H), 7.50 (tt, 1H), 7.38 (t, 2H), 7.34 (t, 2H), 7.21 (d, 1H), 7.19 (d, 1H), 2.28 (s, 3H), 1.34 (s, 9H). |
| 3,5-diisopropyl-1,2-phenylene dibenzoate (IED3) | | δ 8.08 (dd, 2H), 7.00 (dd, 2H), 7.53 (tt, 1H), 7.48 (tt, 1H), 7.39 (t, 2H), 7.31 (t, 2H), 7.11 (d, 1H), 7.09 (d, 1H), 3.11 (heptat, 1H), 2.96 (heptat, 1H), 1.30 (d, 6H), 1.26 (d, 6H). |
| 3,6-dimethyl-1,2-phenylene dibenzoate (IED4) | | δ 8.08 (d, 2H), 7.51 (t, 1H), 7.34 (d, 2H), 7.11 (s, 2H), 2.23 (s, 6H). |

TABLE 1-continued

| Compound | Structure | $^1$H NMR (500 MHz, CDCl$_3$, ppm) |
|---|---|---|
| 4-t-butyl-1,2-phenylene dibenzoate (IED5) | | δ 8.07 (dd, 4H), 7.54 (m, 2H), 7.30-7.40 (m, 7H), 1.37 (s, 9H). |
| 4-methyl 1,2-phenylene dibenzoate (IED6) | | δ (ppm) 8.07 (d, 4H), 7.54 (t, 2H), 7.37 (t, 4H), 7.27 (d, 1H), 7.21 (s, 1H), 7.15 (d, 1H), 2.42 (s, 3H). |
| 1,2-naphthalene dibenzoate (IED7) | | δ 8.21-8.24 (m, 2H), 8.08-8.12 (m, 2H), 7.90-7.96 (m, 2H), 7.86 (d, 1H), 7.60 (m, 1H), 7.50-7.55 (m, 4H), 7.46 (t, 2H), 7.37 (t, 2H). |
| 2,3-naphthalene dibenzoate (IED8) | | δ 8.08-8.12 (m, 4H), 7.86-7.90 (m, 4H), 7.51-7.58 (m, 4H), 7.38 (t, 4H) |
| 1,2-phenylene dibenzoate (IED1)* | | δ 8.08 (dd, 4H), 7.54 (tt, 2H), 7.34-7.43 (m, 8H). |
| 3-methyl-5-tert-butyl-1,2-phenylene dibenzoate (IED2) | | δ 8.08 (dd, 2H), 8.03 (dd, 2H), 7.53 (tt, 1H), 7.50 (tt, 1H), 7.38 (t, 2H), 7.34 (t, 2H), 7.21 (d, 1H), 7.19 (d, 1H), 2.28 (s, 3H), 1.34 (s, 9H). |

TABLE 1-continued

| Compound | Structure | $^1$H NMR (500 MHz, CDCl$_3$, ppm) |
|---|---|---|
| 3,5-diisopropyl-1,2-phenylene dibenzoate (IED3) | | δ 8.08 (dd, 2H), 7.00 (dd, 2H), 7.53 (tt, 1H), 7.48 (tt, 1H), 7.39 (t, 2H), 7.31 (t, 2H), 7.11 (d, 1H), 7.09 (d, 1H), 3.11 (heptat, 1H), 2.96 (heptat, 1H), 1.30 (d, 6H), 1.26 (d, 6H). |
| 3-methyl-5-tert-butyl-1,2-phenylene di(4-methylbenzoate) (IED9) | | δ (ppm) 7.98 (d, 2H), 7.93 (d, 2H), 7.18 (d, 4H), 7.15 (d, 2H), 2.38 (s, 3H), 2.36 (s, 3H), 2.26 (s, 3H), 1.35 (s, 9H). |
| 3-methyl-5-tert-butyl-1,2-phenylene di(2,4,6-trimethylbenzoate) (IED10) | | δ (ppm) 7.25 (s, 1H), 7.21 (s, 1H), 6.81 (d, 4H), 2.36 (s, 3H), 2.30 (d, 6H), 2.25 (s, 6H), 2.23 (s, 6H), 1.36 (s, 9H). |
| 3-methyl-5-tert-butyl-1,2-phenylene di(4-fluorobenzoate) (IED11) | | δ 7.98 (dd, 4H), 7.36 (dd, 4H), 7.21 (s, 1H), 7.17 (s, 1H), 2.26 (s, 3H), 1.34 (s, 9H). |
| 1,2-phenylene dibenzoate (IED1)* | | δ 8.08 (dd, 4H), 7.54 (tt, 2H), 7.34-7.43 (m, 8H). |

TABLE 1-continued

| Compound | Structure | $^1$H NMR (500 MHz, CDCl$_3$, ppm) |
|---|---|---|
| 3-methyl-5-tert-butyl-1,2-phenylene dibenzoate (IED2) | | δ 8.08 (dd, 2H), 8.03 (dd, 2H), 7.53 (tt, 1H), 7.50 (tt, 1H), 7.38 (t, 2H), 7.34 (t, 2H), 7.21 (d, 1H), 7.19 (d, 1H), 2.28 (s, 3H), 1.34 (s, 9H). |
| 3,5-diisopropyl-1,2-phenylene dibenzoate (IED3) | | δ 8.08 (dd, 2H), 7.00 (dd, 2H), 7.53 (tt, 1H), 7.48 (tt, 1H), 7.39 (t, 2H), 7.31 (t, 2H), 7.11 (d, 1H), 7.09 (d, 1H), 3.11 (heptat, 1H), 2.96 (heptat, 1H), 1.30 (d, 6H), 1.26 (d, 6H). |
| 3-methyl-5-tert-butyl-1,2-phenylene di(4-chlorobenzoate) (IED12) | | δ 7.98 (dd, 4H), 7.36 (dd, 4H), 7.21 (s, 1H), 7.17 (s, 1H), 2.26 (s, 3H), 1.34 (s, 9H). |

*comparative

II. Procatalyst Compositions

A procatalyst precursor is charged, according to the weight shown in Table 2, into a flask equipped with mechanical stirring and with bottom filtration. 60 ml of a mixed solvent of TiCl$_4$ and chlorobenzene (1/1 by volume) is introduced into the flask and then 2.52 mmol of internal electron donor is added. The mixture is heated to 115° C. and remains at the same temperature for 60 minutes with stirring at 250 rpm before filtering off the liquid. 60 ml of mixed solvent is added again and the reaction is allowed to continue at the same desired temperature for 60 minutes with stirring followed by filtration. This process is repeated once. 70 ml of iso-octane is used to wash the resultant solid at ambient temperature. After the solvent is removed by filtration, the solid is dried by N$_2$ flow.

TABLE 2

| Procatalyst Precursor | Weight |
|---|---|
| MagTi-1 | 3.0 g |
| SHAC ™ 310 | 2.0 g |

MagTi-1 is a mixed Mag/Ti precursor with composition of Mg$_3$Ti(OEt)$_8$Cl$_2$ (a MagTi precursor prepared according to example 1 in U.S. Pat. No. 6,825,146) with an average particle size of 50 micron. SHAC™ 310 is a benzoate-containing catalyst (a BenMag procatalyst precursor with an average particle size of 27 micron) with ethyl benzoate as the internal electron donor made according to Example 2 in U.S. Pat. No. 6,825,146, the entire content of which is incorporated herein by reference. Titanium content for each of the resultant procatalyst compositions is listed in Table 3.

Procatalyst compositions produced by way of the foregoing procedure are set forth at Table 3.

TABLE 3

| Procatalyst # | Precursor | Donor-1 | Donor-2 | Ti (%) | OEt (%) | EB (%) | Donor-1 (%) |
|---|---|---|---|---|---|---|---|
| 4949-27-1 | MagTi-1 | DiBP | | 3.03 | 0.21 | 0 | 13.68 |
| 4949-29-2 | MagTi-1 | DiBP | | 3.26 | 0.19 | 0 | 13.27 |
| 4949-4-2 | MagTi-1 | IED1 | | 3.17 | 0.26 | 4.94 | trace |
| 4949-5-2 | SHAC ™ 310 | IED1 | | 3.88 | 0.2 | 1.96 | trace |
| 4949-8-2 | MagTi-1 | IED1 | EB | 3.13 | 0.39 | 6.29 | 1.27 |
| 4949-25-1 | MagTi-1 | IED2 | | 3.52 | 0.27 | 4.08 | 10.31 |
| 4949-25-2 | SHAC ™ 310 | IED2 | | 3.23 | 0.11 | 2.33 | 10.62 |
| 4949-54-1 | MagTi-1 | IED3 | | 4.1 | 0.32 | 5.02 | 8.19 |
| 4949-54-2 | MagTi-1 | IED3 | EB | 3.71 | 0.28 | 8.87 | 5.61 |
| 4949-51-3 | MagTi-1 | IED4 | | 2.73 | 0.35 | 0.37 | 8.65 |
| 4949-51-4 | MagTi-1 | IED4 | EB | 2.52 | 0.34 | 1.68 | 7.51 |
| 1590-29-1 | MagTi-1 | IED5 | | 3.13 | 0.33 | 0.26 | 4.50 |
| 1590-29-2[1] | MagTi-1 | IED5 | | 2.82 | 0.25 | 0.08 | 5.64 |

TABLE 3-continued

| Procatalyst # | Precursor | Donor-1 | Donor-2 | Ti (%) | OEt (%) | EB (%) | Donor-1 (%) |
|---|---|---|---|---|---|---|---|
| 1590-29-3[2] | MagTi-1 | IED5 | | 3.99 | 0.37 | 0.28 | 6.15 |
| 1910-27-3 | MagTi-1 | IED6 | | 3.41 | 0.89 | 1.22 | 13.15 |
| 1910-27-4 | SHAC™ 310 | IED6 | | 3.05 | 0.21 | 1.32 | 9.24 |
| 1590-28-1 | MagTi-1 | IED7 | | 3.35 | 0.2 | 0.22 | NM |
| 1590-28-3 | MagTi-1 | IED8 | | 3.73 | 0.19 | 0.15 | NM |
| 1910-14-1 | MagTi-1 | IED9 | | 3.19 | 0.17 | 0 | 2.56 |
| 1910-14-2 | SHAC™ 310 | IED9 | | 2.93 | 0.07 | 0.39 | 3.63 |
| 1910-14-3 | MagTi-1 | IED9 | MeBC | 2.97 | 0.26 | 0 | 1.36 |
| 1910-27-1 | MagTi-1 | IED10 | | 3.95 | 0.44 | 0 | NM |
| 1910-16-1 | MagTi-1 | IED11 | | 2.94 | 0.12 | 0 | 12.23 |
| 1910-16-2 | SHAC™ 310 | IED11 | | 3.03 | 0.07 | 0.93 | 7.54 |
| 1910-16-3 | MagTi-1 | IED12 | | 2.76 | 0.16 | 0 | 12.14 |
| 1910-16-4 | SHAC™ 310 | IED12 | | 1.82 | 0.10 | 0.60 | 8.75 |

[1] = IED added during a 1st and a 2nd halogenation (TiCl4)
[2] = IED added during a 1st, a 2nd, and a 3rd halogenation (TiCl4)
EB = ethyl benzoate
DEP = diethyl phthalate
DiBP = diisobutyl phthalate
IED = internal electron donor (from Table 1)
MeBC = p-methylbenzoyl chloride
NM = not measured
OEt = ethoxide
% = weight percent based on total weight of the procatalyst composition III. Polymerization Polymerization is performed in liquid propylene in a 1-gallon autoclave using separate injection. The external electron donor is n-propyltrimethoxysilane (NPTMS) or dicyclopentyldimethoxysilane (DCPDMS). After conditioning, the reactor is charged with 1375 g of propylene and a desired amount of hydrogen and brought to 62° C. External electron donor, a solution of 0.27-M triethylaluminum in iso-octane, and a suitable amount of 5.0-wt % catalyst slurry in mineral oil (as indicated in data tables below) are premixed in the same vial for 20 minutes at room temperature and then charged into the reactor followed by isooctane flushing using a high pressure catalyst injection pump to initiate the polymerization. After the exotherm, the temperature is controlled to 67° C. Run time is 1 hour.

Reference catalyst performance and resultant polymer properties are provided in Table 4.

TABLE 4

| Procatalyst # | Precursor | Donor-1 | Donor-2 | EED | Procatalyst (mg) | TEAl (mmol) | Al/EED | H2 (scc) | Activity (kg/g-h) | Bulk Density (g/cc) | Melt Flow (g/10 min) | XS (%) | PDI | $T_{M(F)}$ (° C.) |
|---|---|---|---|---|---|---|---|---|---|---|---|---|---|---|
| 4949-27-1 | MagTi-1 | DiBP | | NPTMS | 11.6 | 2 | 8 | 800 | 15.9 | 0.32 | 3.1 | 2.4 | 3.81 | 170.17 |
| | | | | DCPDMS | 11.6 | 2 | 8 | 1250 | 25.5 | 0.38 | 2.4 | 3.5 | 4.54 | 172.15 |
| 4949-29-2 | MagTi-1 | DiBP | | DCPDMS | 16.7 | 2 | 8 | 1500 | 32.9 | 0.37 | 1.8 | 3.9 | 4.68 | 171.92 |
| | | | | DCPDMS | 8.4 | 2 | 8 | 1500 | 30.1 | 0.37 | 2.3 | 3.8 | 4.67 | 172.27 |
| | | | | DCPDMS | 8.4 | 2 | 8 | 10000 | 21.3 | 0.33 | 26.8 | 2.3 | 5.29 | 171.24 |
| | | | | DCPDMS | 8.4 | 2 | 8 | 15000 | 16.8 | 0.31 | 43.2 | 1.8 | 5.41 | 171.19 |
| | | | | DCPDMS | 8.4 | 2 | 8 | 20000 | 22.9 | 0.33 | 74.2 | 1.8 | 5.26 | 170.81 |
| | | | | NPTMS | 16.7 | 2 | 8 | 1000 | 26.5 | 0.35 | 3.1 | 2.8 | 3.89 | 170.25 |
| | | | | NPTMS | 8.4 | 2 | 8 | 1000 | 12.4 | 0.33 | 3.7 | 2.4 | 4.14 | 170.4 |
| | | | | NPTMS | 8.4 | 2 | 8 | 7000 | 14.3 | 0.32 | 43.4 | 2.3 | 4.63 | 169.76 |
| | | | | NPTMS | 8.4 | 2 | 8 | 12000 | 12.1 | 0.30 | 89.4 | 2.4 | 4.57 | 169.41 |
| 4949-4-2 | MagTi-1 | IED1 | EB | DCPCMS | 17.4 | 2 | 4 | 1500 | 20.9 | 0.40 | 3.1 | 7.2 | 6.24 | |
| | | | | NPTMS | 17.4 | 2 | 4 | 1000 | 10.7 | 0.42 | 3.5 | 6.5 | 5.09 | |
| 4949-5-2 | SHAC™ 310 | IED1 | | DCPDMS | 17.4 | 2 | 4 | 1500 | 15.6 | 0.39 | 4.3 | 8.1 | 5.64 | |
| | | | | NPTMS | 17.4 | 2 | 4 | 1000 | 9.1 | 0.36 | 3.6 | 8.1 | | |
| 4949-8-2 | MagTi-1 | IED1 | EB | DCPDMS | 17.4 | 2 | 4 | 1500 | 17.4 | 0.39 | 5.2 | 7.8 | 5.90 | 170.16 |
| | | | | NPTMS | 17.4 | 2 | 4 | 1000 | 9.1 | 0.38 | 5.2 | 6.8 | 4.71 | 169.35 |

DCPDMS = dicyclopentyldimethoxysilane
DiBP = diisobutylphthalate
EB = ethyl benzoate
EED = external electron donor
IED = internal electron donor (Table 1)
NPTMS = n-propyltrimethoxysilane Catalyst performance and resultant polymer properties for catalysts containing phenylene dibenzoate substituted at the 3,5-positions are provided in Table 5.

TABLE 5

| Procatalyst # | Precursor | Donor-1 | Donor-2 | EED | Procatalyst (mg) | TEAl (mmol) | Al/EED | H2 (scc) | Activity (kg/g-h) | Bulk Density (g/cc) | Melt Flow (g/10 min) | XS (%) | PDI | $T_{M(F)}$ (° C.) |
|---|---|---|---|---|---|---|---|---|---|---|---|---|---|---|
| 4949-25-1 | MagTi-1 | IED2 | | DCPDMS | 8.4 | 2 | 8 | 2500 | 51.2 | 0.25 | 1.2 | 2.2 | 5.56 | 172.19 |
| | | | | DCPDMS | 8.4 | 2 | 8 | 5000 | 59.4 | 0.27 | 3.3 | 2.4 | 5.62 | 171.95 |
| | | | | DCPDMS | 8.4 | 2 | 8 | 10000 | 39.6 | 0.28 | 14.4 | 1.8 | 5.43 | 171.39 |
| | | | | DCPDMS | 8.4 | 2 | 8 | 15000 | 42.6 | 0.29 | 34.9 | 1.5 | 5.26 | 171.02 |
| | | | | DCPDMS | 8.4 | 2 | 8 | 20000 | 53.2 | 0.31 | 112.6 | 1.1 | 5.36 | 170.09 |

TABLE 5-continued

| Procatalyst # | Precursor | Donor-1 | Donor-2 | EED | Procatalyst (mg) | TEAl (mmol) | Al/EED | H$_2$ (scc) | Activity (kg/g-h) | Bulk Density (g/cc) | Melt Flow (g/10 min) | XS (%) | PDI | T$_{M(F)}$ (°C) |
|---|---|---|---|---|---|---|---|---|---|---|---|---|---|---|
| 4949-25-2 | SHAC ™ 310 | IED2 | | DCPDMS | 11.6 | 2 | 8 | 1250 | 25.3 | 0.39 | 1.1 | 4.5 | 6.31 | 171.86 |
| | | | | NPTMS | 11.6 | 2 | 8 | 800 | 22.3 | 0.40 | 0.7 | 2.5 | | |
| | | | | NPTMS | 11.6 | 2 | 8 | 8000 | 20.3 | 0.40 | 77.2 | 3.1 | 4.79 | 170.17 |
| 4949-54-1 | MagTi-1 | IED3 | | DCPDMS | 4.8 | 2 | 8 | 1500 | 49.9 | 0.25 | 0.8 | 2.9 | | |
| | | | | DCPDMS | 8.4 | 2 | 8 | 2500 | 45.2 | 0.25 | 1.9 | 3.2 | 6.04 | 171.00 |
| | | | | DCPDMS | 8.4 | 2 | 8 | 5000 | 53.3 | 0.25 | 4.4 | 3.4 | 5.98 | 171.23 |
| | | | | DCPDMS | 8.4 | 2 | 8 | 10000 | 34.0 | 0.26 | 18.8 | 2.1 | 5.85 | 170.74 |
| | | | | DCPDMS | 8.4 | 2 | 8 | 15000 | 56.2 | 0.30 | 50.9 | 1.9 | 5.47 | 170.69 |
| | | | | DCPDMS | 5.9 | 2 | 8 | 20000 | 44.7 | 0.28 | 111.6 | 1.7 | 4.37 | 170.15 |
| 4949-54-2 | MagTi-1 | IED3 | EB | DCPDMS | 4.8 | 2 | 8 | 1500 | 45.1 | 0.27 | 0.8 | 3.4 | | |
| | | | | DCPDMS | 8.4 | 2 | 8 | 2500 | 48.2 | 0.29 | 1.7 | 2.1 | 6.27 | 171.42 |
| | | | | DCPDMS | 5.9 | 2 | 8 | 5000 | 54.0 | 0.27 | 5.6 | 1.9 | 6.14 | 171.31 |
| | | | | DCPDMS | 5.9 | 2 | 8 | 10000 | 48.7 | 0.25 | 23.4 | 2.0 | 5.84 | 170.87 |
| | | | | DCPDMS | 5.9 | 2 | 8 | 15000 | 40.7 | 0.28 | 75.7 | 2.5 | 5.39 | 170.24 |
| | | | | DCPDMS | 5.9 | 2 | 8 | 20000 | 27.5 | 0.28 | 97.8 | 1.2 | 4.48 | 170.25 |

DCPDMS = dicyclopentyldimethoxysilane
EB = ethyl benzoate
EED = external electron donor
IED = internal electron donor (Table 1)
NPTMS = n-propyltrimethoxysilane Catalyst performance and resultant polymer properties for 25 catalysts containing phenylene dibenzoate substituted at the 3,6-positions are provided in Table 6.

TABLE 6

| Procatalyst # | Precursor | Donor-1 | Donor-2 | EED | Procatalyst (mg) | TEAl (mmol) | Al/EED | H$_2$ (scc) | Activity (kg/g-h) | Bulk Density (g/cc) | Melt Flow (g/10 min) | XS (%) | PDI | T$_{M(F)}$ (°C) |
|---|---|---|---|---|---|---|---|---|---|---|---|---|---|---|
| 4949-51-3 | MagTi-1 | IED4 | | NPTMS | 16.7 | 2 | 8 | 1000 | 17.1 | 0.35 | 1.6 | 1.6 | 4.42 | 171.78 |
| | | | | DCPDMS | 16.7 | 2 | 8 | 1500 | 19.3 | 0.35 | 1.8 | 3.0 | 5.07 | 171.99 |
| 4949-51-4 | MagTi-1 | IED4 | EB | NPTMS | 16.7 | 2 | 8 | 1000 | 12.8 | 0.34 | 1.7 | 1.8 | 4.61 | 171.38 |
| | | | | DCPDMS | 16.7 | 2 | 8 | 1500 | 16.7 | 0.32 | 2.5 | 3.4 | 5.21 | 171.83 |

DCPDMS = dicyclopentyldimethoxysilane
EB = ethyl benzoate
EED = external electron donor
IED = internal electron donor (Table 1)
NPTMS = n-propyltrimethoxysilane Catalyst performance and resultant polymer properties for catalysts containing phenylene dibenzoate substituted at the 4-position are provided in Table 7.

TABLE 7

| Procatalyst # | Precursor | Donor-1 | Donor-2 | EED | Procatalyst (mg) | TEAl (mmol) | Al/EED | H$_2$ (scc) | Activity (kg/g-h) | Bulk Density (g/cc) | Melt Flow (g/10 min) | XS (%) | PDI | Tm(f) (°C) |
|---|---|---|---|---|---|---|---|---|---|---|---|---|---|---|
| 1590-29-1 | MagTi-1 | IED5 | | NPTMS | 16.7 | 2 | 8 | 3000 | 25.0 | 0.38 | 6.7 | 4.96 | 5.22 | 169.62 |
| | | | | DCPDMS | 16.7 | 2 | 8 | 4500 | 33.2 | 0.37 | 11.4 | 5.48 | 6.37 | 170.43 |
| 1590-29-2 | MagTi-1 | IED5 | | NPTMS | 16.7 | 2 | 8 | 3000 | 18.6 | 0.33 | 2.6 | 3.27 | 7.05 | 169.87 |
| | | | | DCPDMS | 16.7 | 2 | 8 | 4500 | 26.7 | 0.35 | 3.5 | 4.43 | 7.80 | 170.91 |
| 1590-29-3 | MagTi-1 | IED5 | | NPTMS | 16.7 | 2 | 8 | 3000 | 10.4 | 0.30 | 2.7 | 2.98 | 7.26 | 171.34 |
| | | | | DCPDMS | 16.7 | 2 | 8 | 4500 | 13.7 | 0.31 | 4.1 | 3.56 | 7.55 | 171.40 |
| 1590-29-4 | SHAC ™ 310 | IED5 | | NPTMS | 16.7 | 2 | 8 | 3000 | 18.5 | 0.37 | 7.2 | 5.96 | 6.40 | 169.63 |
| | | | | DCPDMS | 16.7 | 2 | 8 | 4500 | 28.1 | 0.37 | 9.1 | 7.60 | 7.23 | 170.35 |
| 1910-27-3 | MagTi-1 | IED6 | | NPTMS | 8.4 | 2 | 8 | 3000 | 40.0 | 0.26 | 2.1 | 1.63 | 5.36 | 170.85 |
| | | | | DCPDMS | 8.4 | 2 | 8 | 4500 | 43.3 | 0.28 | 1.3 | 2.37 | 5.95 | 172.11 |
| 1910-27-4 | SHAC ™ 310 | IED6 | | NPTMS | 16.7 | 2 | 8 | 3000 | 27.8 | 0.39 | 1.7 | 3.22 | 6.09 | 171.20 |
| | | | | DCPDMS | 16.7 | 2 | 8 | 4500 | 28.9 | 0.40 | 3.8 | 5.21 | 7.17 | 171.26 |

DCPDMS = dicyclopentyldimethoxysilane
EED = external electron donor
IED = internal electron donor (Table 1)
NPTMS = n-propyltrimethoxysilane Catalyst performance and resultant polymer properties for catalysts containing fused aromatic phenylene dibenzoate are provided in Table 8.

TABLE 8

| Procatalyst # | Precursor | Donor-1 | Donor-2 | EED | Procatalyst (mg) | TEAl (mmol) | Al/EED | $H_2$ (scc) | Activity (kg/g-h) | Bulk Density (g/cc) | Melt Flow (g/10 min) | XS (%) | PDI | Tm(f) (° C.) |
|---|---|---|---|---|---|---|---|---|---|---|---|---|---|---|
| 1590-28-1 | MagTi-1 | IED7 | | NPTMS | 16.7 | 2 | 8 | 3000 | 24.0 | 0.30 | 15.1 | 5.69 | 4.51 | 168.76 |
| | | | | DCPDMS | 16.7 | 2 | 8 | 4500 | 34.3 | 0.32 | 9.6 | 7.16 | 5.72 | 170.14 |
| 1590-28-2 | SHAC ™ 310 | IED7 | | NPTMS | 16.7 | 2 | 8 | 3000 | 20.7 | 0.34 | 19.0 | 8.45 | 4.97 | 168.93 |
| | | | | DCPDMS | 16.7 | 2 | 8 | 4500 | 26.0 | 0.34 | 19.5 | 8.63 | 6.13 | 169.88 |
| 1590-28-3 | MagTi-1 | IED8 | | NPTMS | 16.7 | 2 | 8 | 3000 | 25.5 | 0.32 | 6.8 | 4.06 | 4.98 | 169.65 |
| | | | | DCPDMS | 16.7 | 2 | 8 | 4500 | 20.3 | 0.30 | 3.9 | 3.97 | 6.01 | 171.26 |
| 1590-28-4 | SHAC ™ 310 | IED8 | | NPTMS | 16.7 | 2 | 8 | 3000 | 16.3 | 0.34 | 6.1 | 5.23 | 6.26 | 169.96 |
| | | | | DCPDMS | 16.7 | 2 | 8 | 4500 | 32.0 | 0.36 | 6.1 | 7.61 | 7.45 | 170.47 |

DCPDMS = dicyclopentyldimethoxysilane
EED = external electron donor
IED = internal electron donor (Table 1)
NPTMS = n-propyltrimethoxysilane Catalyst performance and resultant polymer properties for catalysts containing substituted phenylene diesters of substituted benzoic acids are provided in Table 9.

TABLE 9

| Procatalyst # | Precursor | Donor-1 | Donor-2 | EED | Procatalyst (mg) | TEAl (mmol) | Al/EED | $H_2$ (scc) | Activity (kg/g-h) | Bulk Density (g/cc) | Melt Flow (g/10 min) | XS (%) | PDI | Tm(f) (° C.) |
|---|---|---|---|---|---|---|---|---|---|---|---|---|---|---|
| 1910-14-1 | MagTi-1 | IED9 | | NPTMS | 16.7 | 2 | 8 | 3000 | 23.9 | 0.31 | 3.7 | 2.96 | 5.15 | 170.20 |
| | | | | DCPDMS | 16.7 | 2 | 8 | 4500 | 30.4 | 0.32 | 4.0 | 3.71 | 5.96 | 170.61 |
| 1910-14-2 | SHAC ™ 310 | IED9 | | NPTMS | 16.7 | 2 | 8 | 3000 | 30.2 | 0.39 | 2.1 | 3.11 | 6.14 | 172.48 |
| | | | | DCPDMS | 16.7 | 2 | 8 | 4500 | 32.2 | 0.39 | 2.7 | 4.18 | 6.33 | 171.65 |
| 1910-14-3 | MagTi-1 | IED9 | MeBC | NPTMS | 16.7 | 2 | 8 | 3000 | 20.3 | 0.29 | 9.5 | 4.58 | 4.84 | 169.45 |
| | | | | DCPDMS | 16.7 | 2 | 8 | 4500 | 24.7 | 0.29 | 5.7 | 4.93 | 6.14 | |
| 1910-27-1 | MagTi-1 | IED10 | | NPTMS | 16.7 | 2 | 8 | 3000 | 27.1 | 0.27 | 19.1 | 3.60 | 5.22 | 170.01 |
| | | | | DCPDMS | 16.7 | 2 | 8 | 4500 | 32.4 | 0.33 | 18.7 | 4.42 | 4.99 | 170.20 |
| 1910-27-2 | SHAC ™ 310 | IED10 | | NPTMS | 16.7 | 2 | 8 | 3000 | 27.6 | 0.35 | 23.8 | 6.12 | 4.97 | 169.55 |
| | | | | DCPDMS | 16.7 | 2 | 8 | 4500 | 34.3 | 0.36 | 20.1 | 6.87 | 5.52 | 170.23 |
| 1910-16-1 | MagTi-1 | IED11 | | DCPDMS | 16.7 | 2 | 8 | 4500 | 31.44 | 0.24 | 2.0 | 2.05 | 5.19 | 171.97 |
| | | | | NPTMS | 8.1 | 2 | 8 | 3000 | 34.3 | 0.33 | 1.6 | 0.86 | 5.11 | 171.71 |
| 1910-16-1 | SHAC ™ 310 | IED11 | | DCPDMS | 16.7 | 2 | 8 | 4500 | 31.4 | 0.24 | 2.0 | 2.05 | 5.19 | 171.97 |
| | | | | NPTMS | 16.7 | 2 | 8 | 3000 | 29.2 | 0.41 | 1.9 | 1.55 | 6.07 | 171.95 |
| 1910-16-3 | MagTi-1 | IED12 | | NPTMS | 16.7 | 2 | 8 | 3000 | 26.9 | 0.31 | 0.7 | 0.71 | 5.41 | 171.22 |
| | | | | DCPDMS | 16.7 | 2 | 8 | 4500 | 34.2 | 0.32 | 1.0 | 1.73 | 5.64 | 171.03 |
| 1910-16-4 | SHAC ™ 310 | IED12 | | NPTMS | 16.7 | 2 | 8 | 3000 | 30.8 | 0.40 | 1.0 | 1.39 | 5.83 | 170.89 |
| | | | | DCPDMS | 16.7 | 2 | 8 | 4500 | 31.2 | 0.40 | 1.8 | 2.47 | 5.70 | 171.29 |

DCPDMS = dicyclopentyldimethoxysilane
EED = external electron donor
IED = internal electron donor (Table 1)
MeBC = p-methylbenzoyl chloride
NPTMS = n-propyltrimethoxysilane The results show that catalyst compositions with substituted phenylene aromatic diester with different structural variety significantly improve catalyst activity, stereoselectivity (XS), molecular weight distribution (PDI), and/or polymer crystallinity (Tm(f)), compared to catalysts compositions containing (i) unsubstituted 1,2-phenylene dibenzoate and/or (ii) phthalate (Table 4). Internal electron donors containing substituted phenylene aromatic dibenzoate can be used with different types of precursors (such as MagTi and BenMag, in particular) to advantageously provide improved catalyst performance and polymers with improved properties. The inclusion of a second internal electron donor, such as ethyl benzoate (EB) or p-methylbenzoyl chloride (MeBC), either from direct addition during catalyst preparation or from the procatalyst precursor, broadens molecular weight distribution. In addition, multiple additions of the internal electron donor, as demonstrated by IED5, improve catalyst stereoselectivity.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:
1. A procatalyst composition comprising:
a combination of a magnesium moiety, a titanium moiety and an internal electron donor comprising a substituted phenylene aromatic diester having the structure (I)

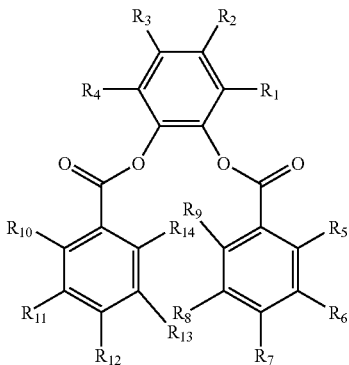

(I)

wherein $R_1$-$R_{14}$ are the same or different, each of $R_1$-$R_{14}$ is selected from the group consisting of hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof;

at least one of $R_1$-$R_4$ is selected from the group consisting of a substituted hydrocarbyl group having 1 to 20 carbon atoms, an unsubstituted hydrocarbyl group having 1 to 20 carbon atoms, and combinations thereof; and $R_1$ is a methyl group and $R_3$ is a t-butyl group.

2. The procatalyst composition of claim 1 wherein at least one of $R_5$-$R_{14}$ is selected from the group consisting of a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

3. The procatalyst composition of claim 1 wherein $R_2$ and $R_4$ are hydrogen.

4. The procatalyst composition of claim 1 comprising an electron donor component selected from the group consisting of a phthalate, a benzoate, a diether, and combinations thereof.

5. A catalyst composition comprising:
    a procatalyst composition comprising a substituted phenylene aromatic diester having the structure (I)

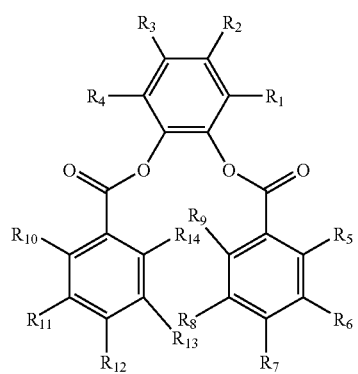

(I)

wherein $R_1$ is a methyl group and $R_3$ is a t-butyl group; and
a cocatalyst.

6. The catalyst composition of claim 5 comprising a member selected from the group consisting of an external electron donor, an activity limiting agent, and combinations thereof.

* * * * *